(12) United States Patent
Viering et al.

(10) Patent No.: US 8,526,957 B2
(45) Date of Patent: Sep. 3, 2013

(54) DE-CENTRALIZED TRANSMIT POWER OPTIMIZATION

(75) Inventors: Ingo Viering, Munich (DE); Olav E. Tirkkonen, Helsinki (FI); Richard Waldhauser, Munich (DE); Krzysztof Kordybach, Pulawy (PL)

(73) Assignee: Nokia Siemens Networks Oy, Espoo (FI)

( * ) Notice: Subject to any disclaimer, the term of this patent is extended or adjusted under 35 U.S.C. 154(b) by 372 days.

(21) Appl. No.: 12/852,857

(22) Filed: Aug. 9, 2010

(65) Prior Publication Data

US 2011/0045865 A1 Feb. 24, 2011

Related U.S. Application Data

(60) Provisional application No. 61/234,706, filed on Aug. 18, 2009.

(51) Int. Cl.
*H04W 36/00* (2009.01)

(52) U.S. Cl.
USPC .......................................... 455/443; 455/522

(58) Field of Classification Search
USPC ................. 455/63.1, 67.11, 443; 370/203
See application file for complete search history.

(56) References Cited

U.S. PATENT DOCUMENTS

| | | | |
|---|---|---|---|
| 5,450,616 A | 9/1995 | Rom | 455/69 |
| 8,023,989 B2 * | 9/2011 | Chang et al. | 455/522 |
| 2002/0022495 A1 | 2/2002 | Choi et al. | 455/522 |
| 2009/0270109 A1 * | 10/2009 | Wang Helmersson et al. | 455/453 |

FOREIGN PATENT DOCUMENTS

| | | |
|---|---|---|
| EP | 0615395 A1 | 9/1994 |
| EP | 1343336 A1 | 9/2003 |
| WO | WO-95/10142 A1 | 4/1995 |
| WO | WO 02103918 A2 | 12/2002 |
| WO | WO 03036815 A1 | 5/2003 |
| WO | WO-2006/118393 A2 | 11/2006 |
| WO | WO 2010/121635 A1 | 10/2010 |

OTHER PUBLICATIONS

"3rd Generation Partnership Project; Technical Specification Group Radio Access Network; Evolved Universal Terrestrial Radio Access Network (E-UTRAN); Self-configuring and self-optimizing network use cases and solutions (Release 9)", 3GPP TR 36.902 V1.2.0, May 2009, 26 pgs.

(Continued)

*Primary Examiner* — Tu X Nguyen
(74) *Attorney, Agent, or Firm* — Harrington & Smith

(57) ABSTRACT

In accordance with the exemplary embodiments of the invention there is at least a method, apparatus, and executable computer program to perform operations including detecting that a cell in a wireless communication system is able to selectively increase or decrease its transmit power by an amount, where the cell is configured with a transmit power and a parameter that indicates a maximum difference in power change, resulting from a change in transmit power, that can exist between a power change of the cell and a power change of a neighbor cell, examining, at the cell, a signal comprising at least one value received from at least one neighbor cell, based on the examining, determining that a transmit power change is possible, modifying a value associated with the transmit power, and modifying the transmit power of the cell by the modified value, and signaling the modified value to the at least one neighbor cell in the wireless communication system.

20 Claims, 7 Drawing Sheets

(56) References Cited

OTHER PUBLICATIONS

"3rd Generation Partnership Project; Technical Specification Group Radio Access Network; Evolved Universal Terrestrial Radio Access (E-UTRA) ; Physical layer—Measurements (Release 8) ", 3GPP TS 36.214, V8.6.0, Mar. 2009, 12 pgs.

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.7.0, Section 6.10.1, pp. 65-72, May 2009.

3rd Generation Partnership Project; Technical Specification group Radio Access Network; Requirements for Further Advancements for Evolved Universal Terrestrial Radio Access (E-URTA) (LTE-Advanced) (Release 8), 3GPP TR 36.913 V8.0.1 (Mar. 2009) pp. 1-15.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) 3GPP TS 36.300 V8.8.0 (Mar. 2009) pp. 1-157.

* cited by examiner

1

DE-CENTRALIZED TRANSMIT POWER OPTIMIZATION

CROSS-REFERENCE TO RELATED APPLICATIONS

This patent application claims priority under 35 U.S.C. §119(e) from Provisional Patent Application No. 61/234,706, filed Aug. 18, 2009 the disclosure of which is incorporated by reference herein in its entirety.

TECHNICAL FIELD

The exemplary and non-limiting embodiments of this invention relate generally to wireless communication systems, methods, devices and computer programs and, more specifically, relate to control of downlink transmit power over a plurality of cells in a de-centralized and self-optimized manner.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
eNB evolved Node B
EUTRA evolved universal terrestrial radio access
LTE long term evolution
LTE-A LTE advanced
MME mobility management entity
OAM operation and maintenance
RSRP reference signal received power
SGW Serving Gateway
SON self-organizing network
TS technical specification
Tx transmit
UE user equipment
CDF cumulative distribution function The specification of a communication system known as evolved UTRAN (EUTRAN, also referred to as UTRAN-LTE or as E-UTRA) is currently nearing completion within the 3GPP. One specification of interest is 3GPP TS 36.300, V8.8.0 (2009-04), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety. Another specification of interest, in particular with respect to self-organizing networks, is 3GPP TR 36.902, V1.2.0 (2009-05), 3rd Generation Partnership Project; Technical Specification Group Radio Access Network; Evolved Universal Terrestrial Radio Access (EUTRA) and Evolved Universal Terrestrial Access Network (EUTRAN); Self-configuring and self-optimizing network use cases and solutions (Release 9).

FIG. 1 reproduces FIG. 4.1 of 3GPP TS 36.300, and shows the overall architecture of the EUTRAN system (Rel-8). The EUTRAN system includes eNBs, providing the E-UTRA user plane and control plane (radio resource control) protocol terminations towards the UE. The eNBs are interconnected with each other by means of an X2 interface. The eNBs are also connected by means of an S1 interface to an evolved packet core (EPC), more specifically to a mobility management entity (MME) by means of a S1-MME interface and to a serving gateway (SGW) by means of a S1-U interface. The S1 interface supports a many to many relationship between MMEs/Serving Gateways and eNBs.

The eNB hosts the following functions:
Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or OAM (operation and maintenance)); and
measurement and measurement reporting configurations to provide mobility and scheduling.

Also of interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8), incorporated by reference herein in its entirety.

Previously power minimization has not been an important element to be considered during the network planning phase. Network planning in many cases is based on the assumption that all cells transmit at maximum power, even if transmitting with less than maximum power would lead to the same results.

Recently interest in energy savings has increased for a number of reasons. Typically, switching off cells which are not needed (e.g. during the night) is assumed to be the most relevant means to save energy. This approach, however, is not particularly advantageous, especially when there is some amount of communication traffic that must be accommodated.

Minimizing the transmit power of the cell offers a significant potential for energy savings, since the power is saved continuously, whereas switching off the cell can only be applied during times of low communication traffic.

SUMMARY

In an exemplary aspect of the invention, there is a method comprising detecting that a cell in a wireless communication system is able to selectively increase and decrease its transmit power by an amount, where the cell is configured with a transmit power and a parameter that indicates a maximum difference in power change, resulting from a change in transmit power, that can exist between a power change of the cell and a power change of a neighbor cell, examining, at the cell, a signal comprising at least one value received from at least one neighbor cell, based on the examining, determining that a transmit power change is possible, modifying a value associated with the transmit power, and modifying the transmit power of the cell by the modified value, and signaling the modified value to the at least one neighbor cell in the wireless communication system.

In an exemplary aspect of the invention, there is a computer readable memory embodying a computer program code executed to perform operations comprising detecting that a cell in a wireless communication system is able to selectively increase or decrease its transmit power by an amount, where the cell is configured with a transmit power and a parameter that indicates a maximum difference in power change, resulting from a change in transmit power, that can exist between a power change of the cell and a power change of a neighbor cell, examining, at the cell, a signal comprising at least one value received from at least one neighbor cell, based on the examining, determining that a transmit power change is possible, modifying a value associated with the transmit power, and modifying the transmit power of the cell by the modified value, and signaling the modified value to the at least one neighbor cell in the wireless communication system.

In another exemplary aspect of the invention, there is an apparatus comprising at least one processor, and at least one memory including computer program code, where the at least one memory and the computer program code are configured, with the at least one processor, to cause the apparatus to at least detect that a cell in a wireless communication system is able to selectively increase and decrease its transmit power by an amount, where the cell is configured with a transmit power and a parameter that indicates a maximum difference in power change, resulting from a change in transmit power, that can exist between a power change of the cell and a power change of a neighbor cell, examine, at the cell, a signal comprising at least one value received from at least one neighbor cell, based on the examining, determine that a transmit power change is possible, modifying a value associated with the transmit power, and modifying the transmit power of the cell by the modified value, and signal the modified value to the at least one neighbor cell in the wireless communication system.

In still another exemplary aspect of the invention, there is an apparatus comprising means for detecting that a cell in a wireless communication system is able to selectively increase or decrease its transmit power by an amount, where the cell is configured with a transmit power and a parameter that indicates a maximum difference in power change, resulting from a change in transmit power, that can exist between a power change of the cell and a power change of a neighbor cell, means for examining, at the cell, a signal comprising at least one value received from at least one neighbor cell, means, based on the examining, for determining that a transmit power change is possible, modifying a value associated with the transmit power, and modifying the transmit power of the cell by the modified value, and means for signaling the modified value to the at least one neighbor cell in the wireless communication system.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of this invention address and solve certain problems related to the downlink in a cellular mobile communication system such as, but not limited to, LTE or LTE-A. In particular, the exemplary embodiments provide a technique for cells to semi-autonomously adjust their transmit power in a de-centralized and self-optimized manner. Benefits that can be obtained from the use of these exemplary embodiments include, but are not limited to, energy savings and compensation for potential holes in cellular coverage, without violating any rules given by OAM.

Figure 1:
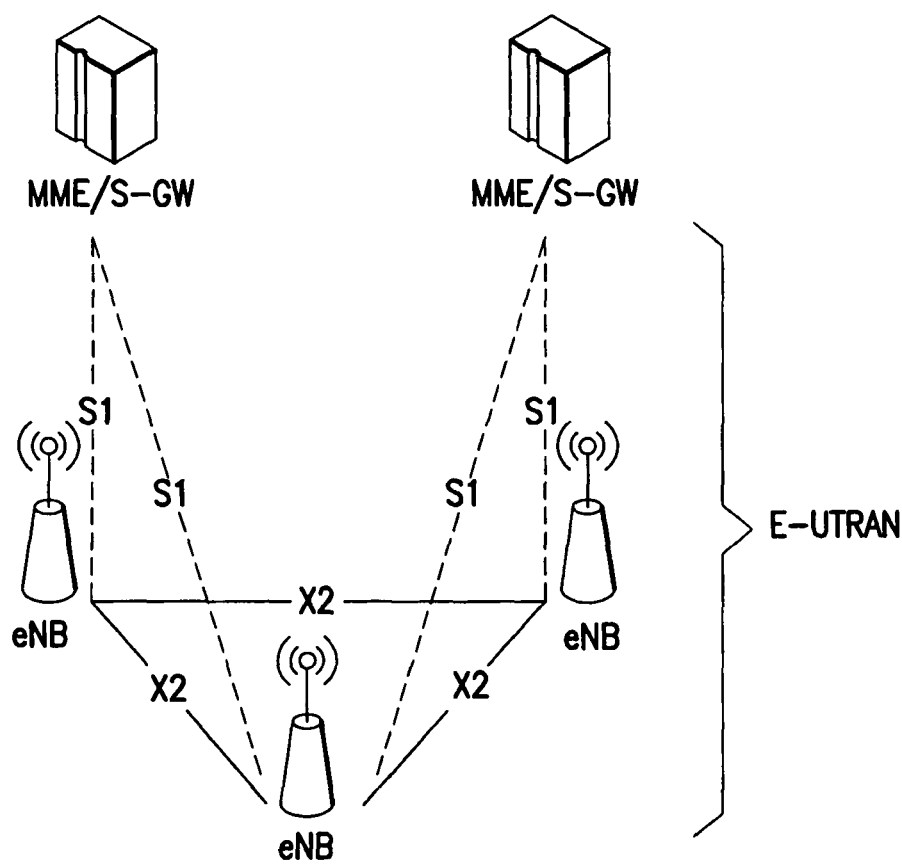
FIG. 1 reproduces FIG. 4.1 of 3 GPP TS 36.300, and shows the overall architecture of the EUTRAN system.
Figure 2:
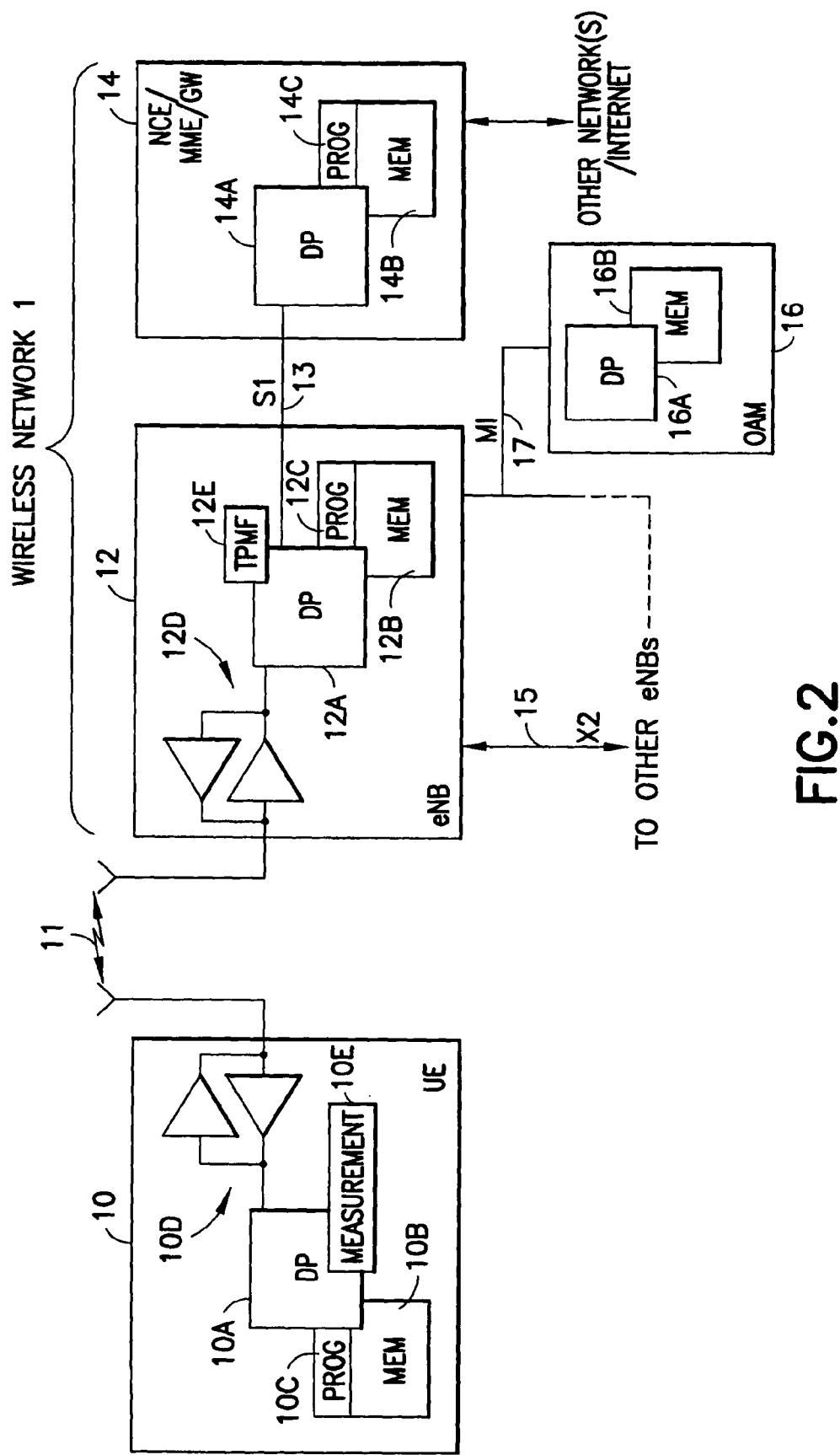
FIG. 2 shows a simplified block diagram of various electronic devices that are suitable for use in practicing the exemplary embodiments of this invention.

Before describing in detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The eNB 12 is assumed to be associated with at least one cell, and in the ensuing description a reference to a "cell" may be assumed to be a reference to the eNB 12 associated with that cell (while the same eNB 12 may also be associated with, or responsible for, at least one other cell). The network 1 may include a network control element (NCE) 14 that may include the MME/SGW functionality shown in FIG. 1, and which provides connectivity with a further network, such as a telephone network and/or a data communications network (e.g., the internet). The network 1 may also include a control node, such as an OAM function or unit 16 which may be co-located with the MME/SGW or separate from the MME/SGW. The OAM 16 has a management interface (MI) 17 with the eNBs 12. The OAM 16 includes at least one data processor 16A and a memory 16B that stores a software program suitable for controlling the operation of the OAM 16. The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

For the purposes of describing the exemplary embodiments of this invention the eNB 12 may be assumed to include a transmit power management function (TPMF) or unit 12E that operates in accordance with the exemplary embodiments of this invention as described in detail below.

At least the PROG 12C is assumed to include program instructions that, when executed by the associated DP 12A, enable the device to operate in accordance with the exemplary embodiments of this invention, as will be discussed below in greater detail. That is, the exemplary embodiments of this invention may be implemented at least in part by computer software executable by the DP 12A of the eNB 12, or by hardware, or by a combination of software and hardware (and firmware). For example, the TPMF 12E may be implemented solely as computer instructions executable by the DP 12A, or solely as logic circuits, or as a combination of computer instructions and logic circuits.

In an exemplary LTE embodiment the UE 10 may be assumed to include a measurement unit 10E configured to make at least cell-specific reference signal measurements, and to formulate and transmit reference signal received power (RSRP) reports to the eNB 12.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Describing now the exemplary embodiments of this invention in greater detail, it is first noted that every individual cell (eNB 12) receives measurement reports from the connected UEs 10. The measurement reports include the signal strength of downlink reference signals (RSRP). 3GPP TS 36.214 V8.6.0 (2009-03) Technical Specification 3rd Generation Partnership Project; Technical Specification Group Radio Access Network; Evolved Universal Terrestrial Radio Access (E-UTRA); Physical layer—Measurements (Release 8), which defines, in subclause 5.1.1, the RSRP as the linear average over the power contributions (in [W]) of the resource elements that carry cell-specific reference signals within the considered measurement frequency bandwidth. For RSRP determination the cell-specific reference signals R0 according to 3GPP TS 36.211 are to be used. If the UE can reliably detect that R1 is available it may use R1 in addition to R0 to determine RSRP. If receiver diversity is in use by the UE, the reported value shall not be lower than the corresponding RSRP of any of the individual diversity branches.

3GPP TS 36.211 V8.7.0 (2009-05) Technical Specification 3rd Generation Partnership Project; Technical Specification Group Radio Access Network; Evolved Universal Terrestrial Radio Access (E-UTRA); Physical Channels and Modulation (Release 8) describes in subclause 6.10 the downlink reference signals, and in subclause 6.10.1 the cell-specific reference signals are described.

If the RSRP reports are recorded over a sufficiently long period of time important information about the current coverage situation in a cell can be retrieved.

For example, if the worst occurring RSRPs are still significantly larger than a suitable threshold value (typically in the range of thermal noise), the cell can be assumed to be interference limited. In this case, the transmit power could be reduced without impacting the coverage.

Further by example, if there are RSRP values which are already in the range of the threshold, this indicates that there are UEs for which the signal strength might already be at its limit, i.e., those UEs have a coverage problem. In this case the cell should definitely not reduce the transmit power and, instead, the cell should increase the transmit power so long as it is not already transmitting at its maximum power.

Figure 3:
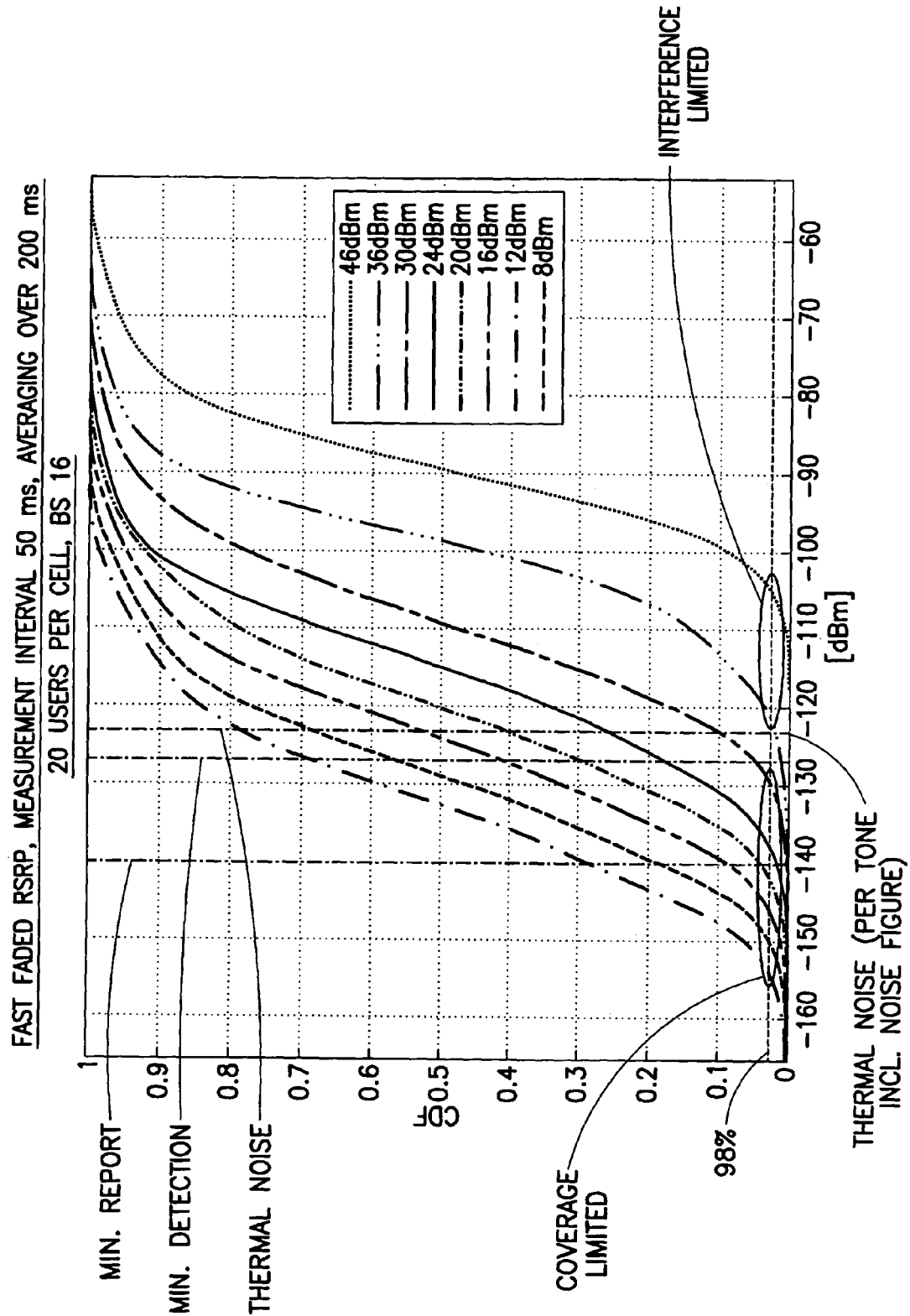
FIG. 3 is a graph that plots CDF versus dBm and is indicative of coverage information that is signaled to a central node.

FIG. 3 shows exemplary RSRP statistics collected by different cells (of the same size) using different transmit powers. FIG. 3 assumes fast-faded RSRP, a measurement interval of 50 ms, averaging over 200 ms and 20 users per cell. The cells in this non-limiting example are relatively small (inter-site distance of 500 m). One may observe that all occurring RSRPs are removed from the noise thresholds if the largest Tx power of 46 dBm is used. This indicates that power could be reduced without affecting coverage. Smaller Tx powers bring the RSRP statistic closer to the noise threshold, indicating that power should not be reduced, or increased, if possible.

On the other hand, if a single cell changes it's transmit power (and its neighbouring cell(s) do not) the cell boundaries would be affected. This occurrence would undermine network planning and is therefore not desired. There are other mechanisms which adjust the cell boundary due to traffic conditions in the OAM domain, which are based on significantly more knowledge than is available to an individual cell (eNB 12). In general, an individual cell should not be allowed to adjust its' transmit power autonomously.

It is typically the case that centralized solutions are assumed for transmit power minimization. That is, some central node (e.g., the OAM 16) will collect information from many cells and make a central decision on the transmit power for those cells. However, the use of this centralized solution has certain disadvantages. For example, a particular cell has much more detailed knowledge of the radio environment in its own served area (e.g., through RSRP reports). Only a subset of this knowledge is reported to the OAM 16 from the eNB 12. Further by example, the use of the centralized solution tends to generate a substantial amount of signaling overhead on the backhaul interface. Further by example, the centralized solution may be difficult to specify to operate in a multi-vendor environment. Further by example, and in general, the use of the centralized approach can result in long and undesirable latencies.

In accordance with the exemplary embodiments of this invention the problems discussed above are addressed and solved by the implementation of a distributed/de-centralized power control solution. A distributed solution is a solution where every cell (every eNB 12 for a case where each eNB is responsible for but a single cell) exchanges information with each of its neighbors (such as by using the X2 interface shown in FIG. 1). Every cell executes a local optimization considering the information received from the X2 interface (possibly in combination with certain constraints imposed by a relevant standard or specification, and/or imposed by the OAM 16). For example, it may be desirable that the OAM 16 maintain control over the whole process (the macro-process). For example, the impact on cell boundaries should be limited, as well as the maximum degree of power reduction.

As was noted previously, in some cases a particular instance of an eNB may be responsible for more than one cell, and thus information exchanged over the X2 interface with another eNB may actually pertain to more than one cell for which the particular instance of the eNB is responsible. In this case the particular instance of the eNB will run optimizations for all of the cells for which it is responsible.

While controlling the maximum degree of power reduction may be straight forward, limiting the impact on the cell boundary is a more complex control case.

In accordance with the exemplary embodiments of this invention some central node (e.g., the OAM 16) configures or provisions a parameter that represents a certain power difference $\Delta P$ (e.g., 1 dB) which limits the spatial shift of the cell boundaries. The principle is that the power reduction of any two neighbor cells is allowed to deviate only by as much as this value, or less than this value, but not more than this value. An example is given in FIG. 4 where $\Delta P=2$ dB. This constraint serves to maintain the cell boundaries, and may be described as follows (note that $\Delta P$ may be cell-specific, or it may be the same for all cells, or it may be the same for a group of cells (but not all cells)).

(A) Assume that every cell c is configured with a certain Tx power $P_c$ (by network planning/OAM 16).
(B) Furthermore, assume that the OAM 16 has configured a $\Delta P_c$ to every cell as described above (which could be the same for all cells, or different for every cell).
(C) Every cell has a local parameter $R_c$ which indicates by how much the cell has reduced the configured Tx power, so that the actual Tx power is $P_c-R_c$.
(D) Every cell c signals $R_c$ to its neighborhood (e.g., via X2). It can be noted that immediately after network planning (or after a reset) all $R_c$ may be $R_c=0$ dB.
(E) $R_c$ may be signaled from each cell c periodically, and/or if a cell has modified its own $R_c$, and/or if it is requested/polled by another cell.
(F) Assume that cell c0 detects that it would be able to reduce its Tx power by $R_{c,max}$ (such as by observing the RSRP statistics as described above, or by any other means).
(G) The cell c0 then examines the values of $R_c$ received from its neighbor cells $c \in N_{c0}$ (where $N_{c0}$ is a neighbor cell list).
(H) Assume that, based on the received $R_c$ values from its neighbor cells, cell c0 is allowed to reduce its Tx power by $R_{c0}=\min_n (R_n+\Delta P)$ with $n \in N_{c0}$.
(I) Assuming that cell c0 changes $R_{c0}$ (and thereby its Tx power), it informs its neighbor cells by providing the new $R_{c0}$ value on (for example) X2, (in the non-limiting LTE or LTE-A case).

The use of this technique guarantees that the constraint $\Delta P$ is observed while the cells operate to reduce their Tx power (semi-)autonomously. That is, the individual eNBs 12 make their own TX power setting decisions for each cell or cells for which the eNB 12 is responsible, but in view of certain externally imposed constraints including $\Delta P$ and a maximum allowed Tx power.

Note in the foregoing that if a particular eNB 12 is serving more than one cell, then signaling a value of $R_c$ to another cell and receiving a value of $R_c$ from another cell may actually be occurring intra-eNB, and not inter-eNB over the X2 interface (for the non-limiting LTE or LTE-A embodiments).

Powering up (increasing Tx power) may be considered as a special case. Powering up may be the consequence of either having reduced the Tx power too aggressively, or due to some environmental change (e.g., a new building) resulting in an occurrence of a coverage hole.

It is desirable that powering up should be given priority. In one case, if a cell realizes that it needs more Tx power (and it still has Tx power left, i.e., it is not already transmitting at its maximum allotted Tx power) the cell should increase its power and inform other cells of the "reduced power reduction" $R_{c0}$. Upon reception of a "reduced power reduction value" $R_{c0}$, i.e., an $R_{c0}$ which is smaller than the previous value, the neighbors shall immediately adapt the Tx power accordingly (again using the equation above $R_{c0}=\min_n (R_n+\Delta P)$). If this would violate the OAM 16 configured values, or the maximum Tx power, an appropriate alarm message (with the underlying measurements) may be sent to the OAM 16, and the cells 12 returns to the OAM configured value. Furthermore, the OAM 16 is configured so as to be able to reset the Tx powers of the various cells at any time, i.e., the affected cells return to the configured values.

With respect to standardization of the exemplary embodiments of this invention, the following operations may be defined: the OAM 16 configuration of $\Delta P_c$ (which is the maximum difference of power reduction) and the signaling of the $\Delta P_c$ to the various eNBs 12, the exchange of the power reduction value $R_c$ (including its triggering) between the eNBs 12, the rule that for a given eNB 12 the power reduction may only be $\Delta P$, below its neighbors, and the exception made for powering up.

As may be appreciated, an important and beneficial aspect of this invention is that it is distributed/de-centralized and therefore is much simpler to implement and operate than a centrally controlled approach. Furthermore it can be readily configured to operate in a multi-vendor environment.

The following simplified example illustrates the utility that is gained by the use of the exemplary embodiments of this invention. Assume a case of three cells such that each cell is a neighbour of the other. Note that each of the three cells may actually be controlled by the same eNB 12, or two of the three cells may be controlled by the same eNB 12, or each of the three cells may be controlled by a different eNB 12. Assume as well that all cells are configured with a maximum Tx power of 46 dBm and that the OAM 16 has configured $\Delta P=2$ dB for all the considered cells. Based on their respective RSRP statistics (or based on any other algorithm) the cells have determined that they could reduce the Tx power by $R_{c,max}=5$ dB, 4 dB, and 3 dB (without impacting coverage).

Without loss of generality assume that the cell with the 5 dB limit executes first, the cell with 4 dB limit executes next, and then the 3 dB cell executes last, and so forth.
(A) The first cell (with the 5 dB limit) reduces its Tx power initially only by 2 dB (since the other cells have not yet reduced their Tx power).
$R_c=2$ dB, 0 dB, 0 dB
(B) The second cell (with the 4 dB limit) can also reduce only by 2 dB (since it still has one neighbor cell which has not yet reduced its Tx power)
$R_c=2$ dB, 2 dB, 0 dB
(C) The third cell would be able to reduce up to 4 dB (since the neighbor cells have already reduced by 2 dB), however it can only reduce to 3 dB due to its own coverage limit).
$R_c=2$ dB, 2 dB, 3 dB (D) Next the first cell can now reduce by 4 dB (as there is still a 2 dB neighbor cell).

$R_c$=4 R, 2 dB, 3 dB (E) The second cell could reduce by up to 5 dB, however is limited to 4 dB.

$R_c$=4 dB, 4 dB, 3 dB (F) The third cell cannot reduce its Tx power any further.

(G) Finally, the first cell can reduce by 5 dB.

$R_c$=5 dB, 4 dB, 3 dB

Note that in this exemplary case the $\Delta P$=2 dB limit did not lead to a constraint at all.

However, this situation would change if the same example were to be used with the limits of 7 dB, 4 dB, 3 dB. In this case the steps (A)-(F) would appear exactly the same as above. However, in the last step (G) the first cell could have reduced by 6 dB such that $R_c$=6 dB, 4 dB, 3 dB, although it could have reduced by 7 dB (which would have violated the $\Delta P$=2 dB constraint).

Figure 4:
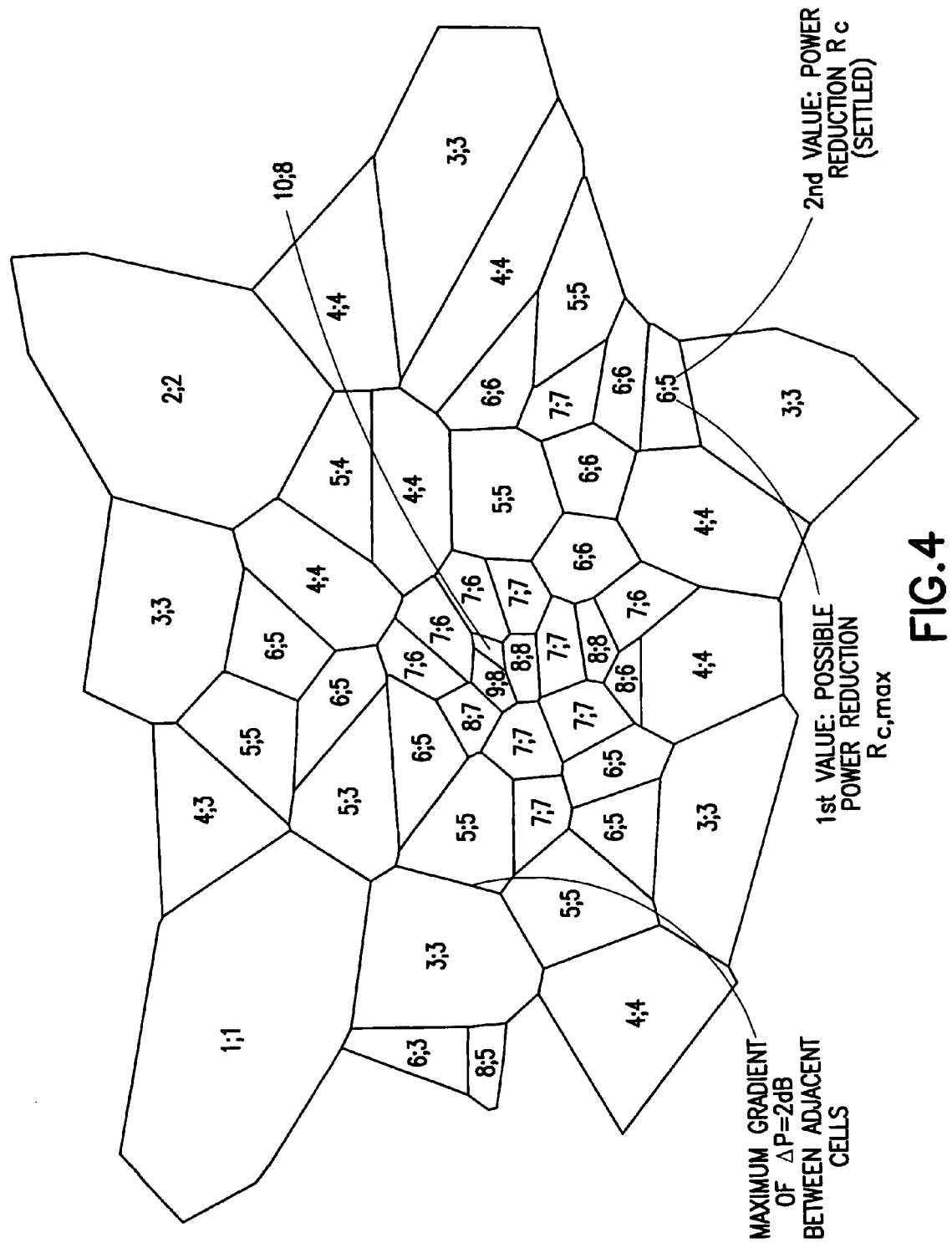
FIG. 4 shows an exemplary coverage scenario using the de-centralized Tx power optimization in accordance with the exemplary embodiments of this invention.

Note that this distributed solution leads exactly to the same result as a centralized solution, as shown in FIG. 4.

The consequences of the use of these exemplary embodiments may be made more apparent by considering a scenario which has a local concentration of small cells as shown in FIG. 4. The assumption is that small cells can reduce their power, whereas the large cells cannot. The ability of reducing the power is given by the first value in every cell. It is assumed in FIG. 4 that the (OAM) allowed shift of cell boundaries is $\Delta P$=2 dB for all cells. Assume that the OAM 16 configures certain values. Initially every cell is allowed to reduce its power by $\Delta P$=2 dB (if it can afford to). After a specific period the inner cells receive R, reports indicating that the neighbors have also reduced power, so that they can further reduce their Tx power. This process continues, and the area of allowed reduction becomes smaller. The second value shows the deviations R, after the Tx changing process has converged. Note that the deviations R, of any neighbor pair never differ by more than 2 dB.

There are a number of advantages and technical effects that can be realized by the use of the exemplary embodiments of this invention. For example, the use of these exemplary embodiments provides a method, apparatus and computer program(s) to enable a de-centralized and distributed approach to transmit power control amongst a group of cells.

Figure 5:
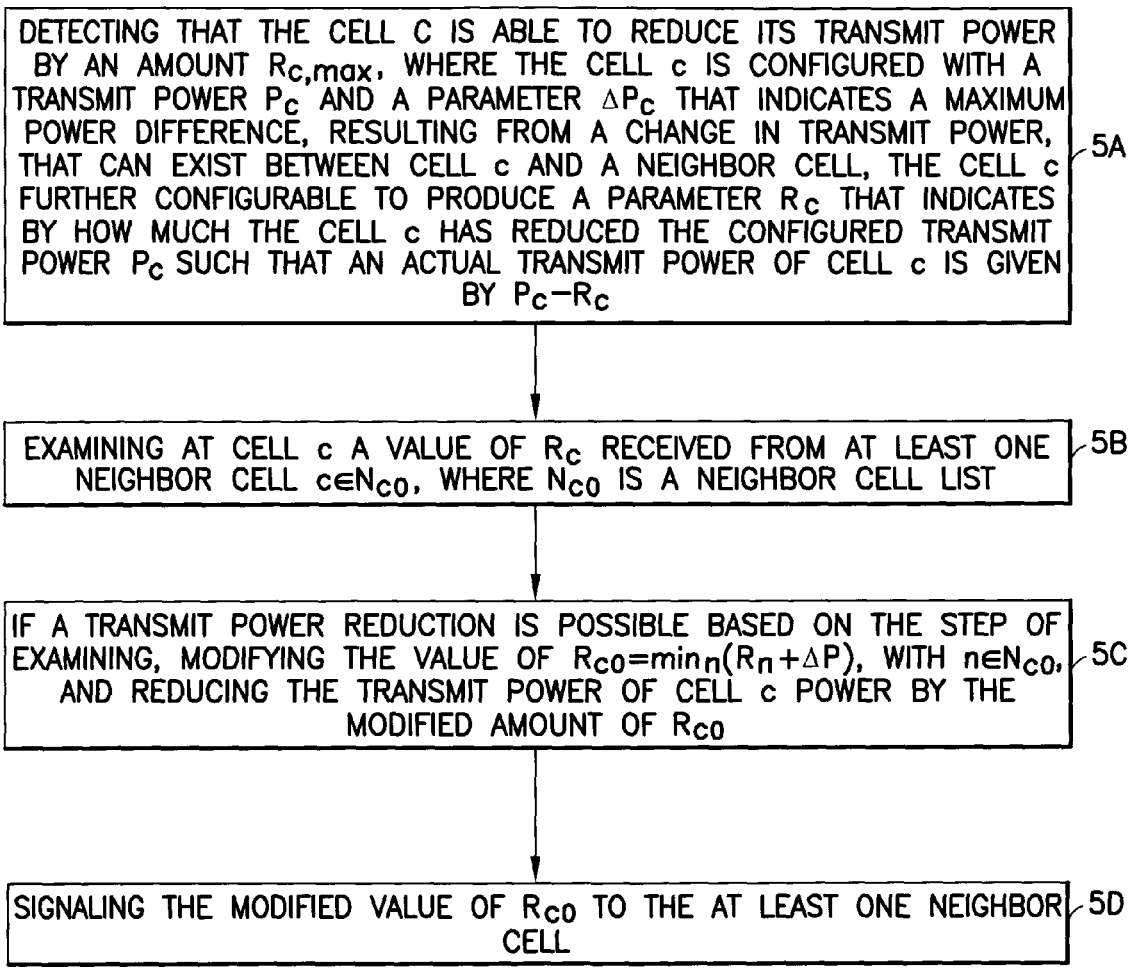
FIG. 5 is a logic flow diagram that illustrates the operation of a method, and a result of execution of computer program instructions embodied on a computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method executed in a cell c performs, at Block 5A, a step of detecting that the cell c is able to reduce its transmit power by an amount $R_{c,max}$, where the cell c is configured with a transmit power $P_c$ and a parameter $\Delta P_c$ that indicates a maximum power difference, resulting from a change in transmit power, that can exist between cell c and a neighbor cell, the cell c further configurable to produce a parameter R, that indicates by how much the cell c has reduced the configured transmit power $P_c$ such that an actual transmit power of cell c is given by $P_c - R_c$. At Block 5B there is a step of examining at cell c a value of R, received from at least one neighbor cell c∈$N_{c0}$, where $N_{c0}$ is a neighbor cell list. At Block 5C, if a transmit power reduction is possible based on the step of examining, there is a step of modifying the value of $R_{c0}$=$\min_n$($R_n$+$\Delta P$), with n∈$N_{c0}$, and reducing the transmit power of cell c power by the modified amount of $R_{c0}$. At Block 5D there is step of signaling the modified value of $R_{c0}$ to the at least one neighbor cell.

In accordance with the method of FIG. 5, where $R_c$ is signaled from cell c periodically.

In accordance with the method of FIG. 5, where $R_c$ is signaled from cell c in response to cell c modifying $R_c$.

In accordance with the method of FIG. 5, where $R_c$ is signaled from cell c in response to a request received from the at least one neighbor cell.

In accordance with the method of FIG. 5, where $R_c$ is signaled from cell c over an X2 interface.

In accordance with the method of FIG. 5, where the step of detecting comprises receiving measurement reports from a plurality of user equipment operating in the cell c.

In accordance with the method of the preceding paragraph, where the measurement reports are indicative a reference signal received power.

In accordance with the method of FIG. 5, where the parameter $\Delta P_c$ is received from a control node of a wireless communication system in which the cell c operates.

In accordance with the method of the preceding paragraph, where the control node is an operation and maintenance node, and where the parameter $\Delta P_c$ is received over a management interface.

In accordance with the method of FIG. 5, where the values of the parameters $\Delta P_c$ is determined by a network control node in accordance with a maximum amount of spatial shift in a boundary of the cell.

In accordance with the method of FIG. 5, the step of detecting instead determines that the cell c should increase the transmit power, further comprising modifying the value of $R_{c0}$=$\min_n$ ($R_n$+$\Delta P$), with n∈$N_{c0}$, increasing the transmit power of cell c power by the modified amount of $R_{c0}$, and signaling the modified value of $R_{c0}$ to the at least one neighbor cell.

In accordance with the method of FIG. 5, in response to receiving a modified value of $R_{c0}$ from the neighbor cell, where $R_{c0}$ is smaller than a previous value received from the neighbor cell, increasing the transmit power in accordance with $R_{c0}$=$\min_n$ ($R_n$+$\Delta P$).

In accordance with the method of the preceding paragraph, where if increasing the transmit power would violate a configured value of transmit power, sending an alarm message instead of increasing the transmit power.

The exemplary embodiments of this invention also pertain to an apparatus comprising a processor and a memory that includes computer program code. The memory and the computer program code are configured, with the processor, to cause the apparatus to detect that a cell c is able to reduce its transmit power by an amount $R_{c,max}$, where the cell c is configured with a transmit power $P_c$ and a parameter $\Delta P_c$ that indicates a maximum power difference, resulting from a change in transmit power, that can exist between cell c and a neighbor cell, the cell c further configurable to produce a parameter R, that indicates by how much the cell c has reduced the configured transmit power $P_c$ such that an actual transmit power of cell c is given by $P_c - R_c$; examine a value of $R_c$ received from at least one neighbor cell c∈$N_{c0}$, where $N_{c0}$ is a neighbor cell list; and if a transmit power reduction is possible, modify the value of $R_{c0}$=$\min_n$ ($R_n$+$\Delta P$), with n∈$N_{c0}$, and reduce the transmit power of cell c power by the modified amount of $R_{c0}$; and signal the modified value of $R_{c0}$ to the at least one neighbor cell.

In accordance with the apparatus of the preceding paragraphs, where $R_c$ is signaled from cell c periodically, and/or is signaled from cell c in response to cell c modifying $R_c$, and/or is signaled from cell c in response to a request received from the at least one neighbor cell.

In accordance with the apparatus of the preceding paragraphs, where $R_c$ is signaled from cell c over an X2 interface.

In accordance with the apparatus of the preceding paragraphs, where detecting comprises receiving measurement reports from a plurality of user equipment operating in the cell c.

In accordance with the apparatus of the preceding paragraph, where the measurement reports are indicative a reference signal received power.

In accordance with the apparatus of the preceding paragraphs, where the parameter $\Delta P_c$ is received from a control node of a wireless communication system in which the cell c operates.

In accordance with the apparatus of the preceding paragraph, where the control node is an operation and maintenance node, and where the parameter $\Delta P$ is received over a management interface.

In accordance with the apparatus of the preceding paragraph, where the values of the parameters $\Delta P_c$ is determined by the network control node in accordance with a maximum amount of spatial shift in a boundary of the cell.

In accordance with the apparatus of the preceding paragraphs, where detecting instead determines that the cell c should increase the transmit power, and the apparatus is further controlled to modify the value of $R_{c0}=\min_n(R_n+\Delta P)$, with $n \in N_{c0}$, to increase the transmit power of cell c power by the modified amount of $R_{c0}$ and signal the modified value of $R_{c0}$ to the at least one neighbor cell.

In accordance with the apparatus of the preceding paragraphs, in response to receiving a modified value of $R_{c0}$ from the neighbor cell, where $R_{c0}$ is smaller than a previous value received from the neighbor cell, the apparatus is controlled to increase the transmit power in accordance with $R_{c0}=\min_n (R_n+\Delta P)$.

In accordance with the apparatus of the preceding paragraph, where if increasing the transmit power would violate a configured value of transmit power, the apparatus is further controlled to send an alarm message instead of increasing the transmit power.

In accordance with the apparatus of the preceding paragraphs, where the apparatus comprises a part of an eNB that forms a part of an LTE or an LTE-A wireless communication network.

Figure 6:
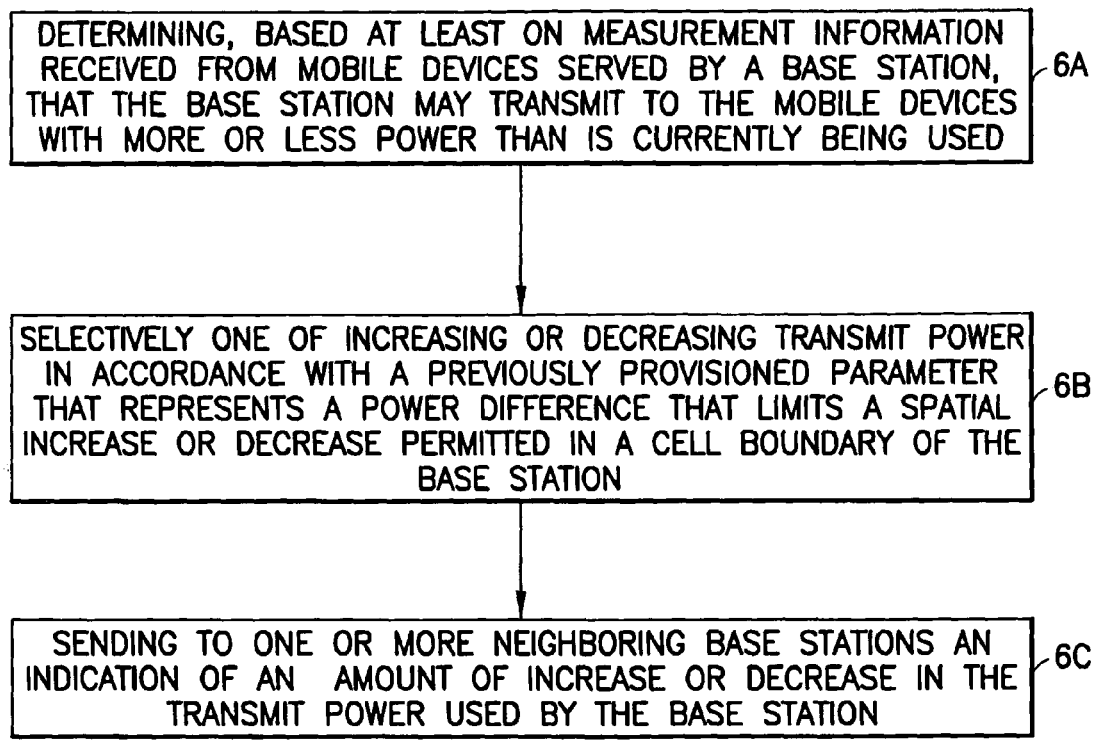
FIG. 6 is a logic flow diagram that illustrates the operation of a method, and a result of execution of computer program instructions embodied on a computer readable memory, further in accordance with the exemplary embodiments of this invention.

FIG. 6 is a logic flow diagram that illustrates the operation of a method, and a result of execution of computer program instructions, further in accordance with the exemplary embodiments of this invention. In accordance with these exemplary embodiments at 6A there is a step of determining, based at least on measurement information received from mobile devices served by a base station, that the base station may transmit to the mobile devices with more or less power than is currently being used. At 6B there is a step of selectively one of increasing or decreasing transmit power in accordance with a previously provisioned parameter that represents a power difference that limits a spatial increase or decrease permitted in a cell boundary of the base station. At 6C there is a step of sending to one or more neighboring base stations an indication of an amount of increase or decrease in the transmit power used by the base station.

The method as in the previous paragraph, where the parameter is provisioned to the base station from an operation and maintenance node of a cellular system over a management interface, and where sending occurs over an X2 interface of the cellular system The exemplary embodiments of this invention also relate to an apparatus that comprises means for determining, based at least on measurement information received from mobile devices served by a base station, that the base station may transmit to the mobile devices with more or less power than is currently being used; means for selectively one of increasing or decreasing transmit power in accordance with a previously provisioned parameter that represents a power difference that limits a spatial increase or decrease permitted in a cell boundary of the base station; and means for sending to one or more neighboring base stations an indication of an amount of increase or decrease in the transmit power used by the base station.

The apparatus as in the previous paragraph, where the parameter is provisioned to the base station from an operation and maintenance node of a cellular system over a management interface, and where said means for sending uses an X2 interface of the cellular system.

Figure 7:
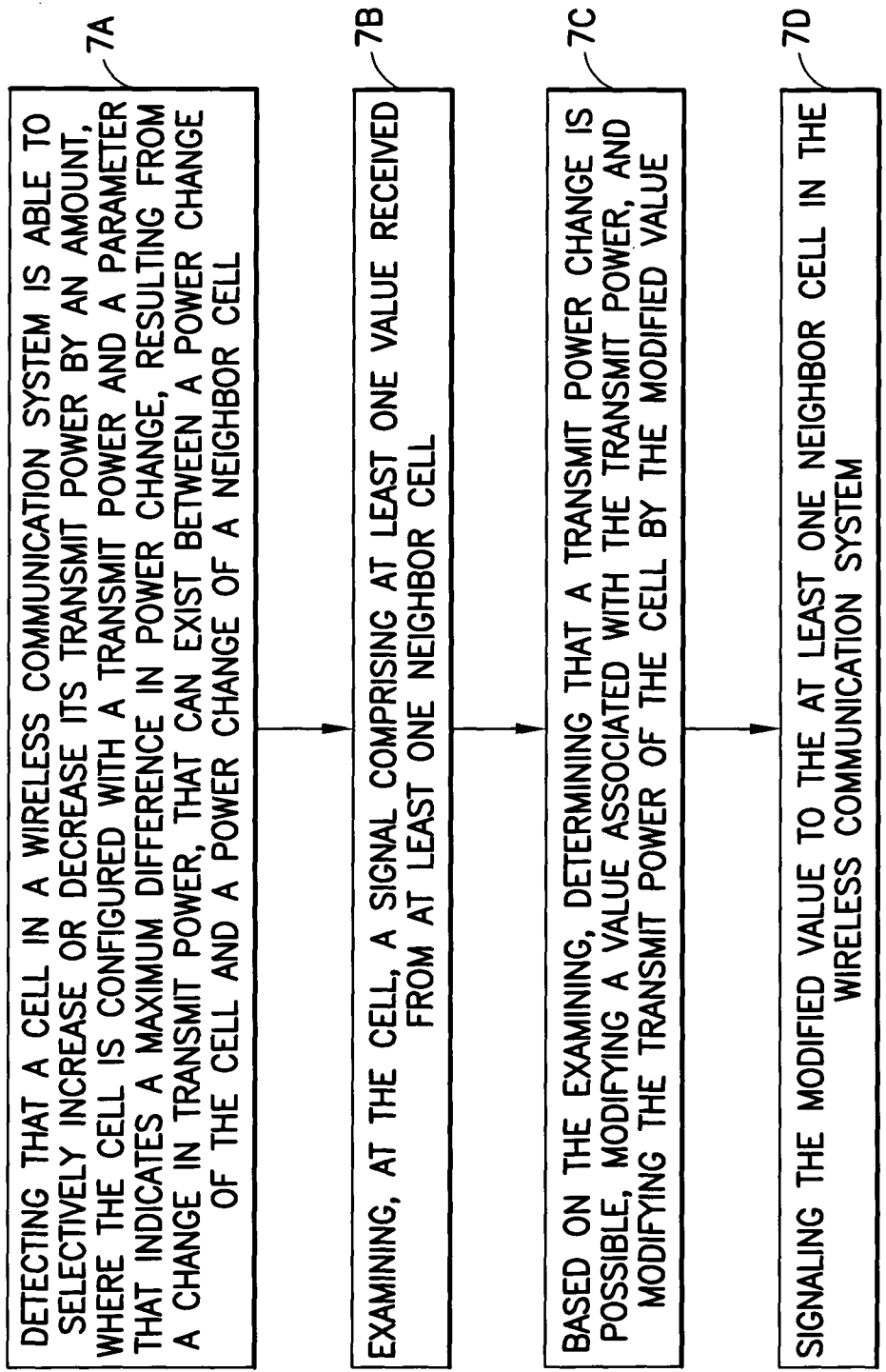
FIG. 7 is a logic flow diagram that illustrates the operation of a method, and a result of execution of computer program instructions embodied on a computer readable memory, further in accordance with the exemplary embodiments of this invention.

FIG. 7 is another logic flow diagram that illustrates the operation of a method, and a result of execution of computer program instructions, in accordance with the exemplary embodiments of this invention. In accordance with these exemplary embodiments a method executed in a cell of a wireless communication system performs, at Block 7A, a step of detecting that a cell in a wireless communication system is able to selectively increase or decrease its transmit power by an amount, where the cell is configured with a transmit power and a parameter that indicates a maximum difference in power change, resulting from a change in transmit power, that can exist between a power change of the cell and a power change of a neighbor cell. At Block 7B there is a step of examining, at the cell, a signal received from at least one neighbor cell. At Block 7C, there is a step of, based on the examining, determining that a transmit power change is possible, modifying a value associated with the transmit power, and modifying the transmit power of the cell by the modified value. At Block 7D there is step of signaling the modified value to the at least one neighbor cell in the wireless communication system.

Further, in accordance with the paragraph above, a symbol $P_c$ represents the transmit power of the cell, where a symbol $R_{c,max}$ represents the amount that the cell c is able to change it's transmit power, where a symbol Rc represents the actual change of the transmit power, where a symbol $\Delta P_c$ represents the parameter that indicates the maximum difference of power changes, where $c \in N_{c0}$ represents the at least one neighbor cell, where a symbol $N_{c0}$ is a neighbor cell list, where a symbol $R_{c0}=\min_n (R_n+\Delta P)$ represents the value associated with the transmit power of the cell, and where modifying the value comprises modifying $R_{c0}$ with $n \in N_{c0}$.

In addition, in accordance with any of the above paragraphs, the cell is configurable to produce a parameter $R_c$ that indicates by how much the cell has reduced a configured transmit power $P_c$ such that an actual transmit power of the cell is given by $P_c-R_c$.

Further, in accordance with the previous paragraph, the parameter $R_c$ is at least one of signaled from the cell periodically, signaled from the cell in response to the cell modifying the parameter $R_c$, and signaled from the cell in response to a request received from the at least one neighbor cell.

Additionally, in accordance with the previous paragraphs, where the parameter $R_c$ is signaled from the cell over an X2 interface.

In addition, in accordance with any of the above paragraphs, detecting comprises receiving measurement reports from a plurality of user equipment operating in the cell, and where the measurement reports are indicative a reference signal received power.

Further, in accordance with the above paragraphs, the parameter that indicates the maximum power difference is one of received from a control node of the wireless communication system in which the cell operates or received over a management interface.

Additionally, in accordance with any of the above paragraphs there is, in response to receiving, a modified value associated with a transmit power from the at least one neighbor cell, where the modified value is smaller than a previous value received from the neighbor cell, increasing the transmit power in accordance with the received modified value.

Further, in accordance with the above paragraphs, if increasing the transmit power would violate a configured value of transmit power, sending an alarm message instead of increasing the transmit power.

In accordance with the above paragraphs, receiving a signal comprising measurement information from at least one mobile device served by abase station, where the measurement information indicates that the base station may transmit to the at least one mobile device with more or less power than is currently being used, based on examining the signal, selectively increasing or decreasing transmit power in accordance with a previously provisioned parameter that represents a power difference that limits a spatial increase or decrease permitted in a cell boundary of the base station, and sending to the one or more neighboring base stations an indication of an amount of increase or decrease in the transmit power used by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE (Rel-8) and LTE-A systems, it should be appreciated that the exemplary embodiments of this invention are not limited for use with only these particular types of wireless communication system and/or releases thereof, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to message elements (e.g., information related to RSRP, etc.) are not intended to be limiting in any respect, as these various elements may be identified by any suitable names.

In addition, the various terms, mathematical operations, parameters, values, etc., disclosed in this description, for example $P_c$, $\Delta P_c$, $R_{c,max}$, $R_c$, $c \in N_{c0}$, $N_{c0}$, $R_{c0} = \min_n (R_n + \Delta P)$, and $R_{c0}$ with $n \in N_{c0}$, to name a few, are non-limiting and as such any such terms, mathematical operations, parameters, values, etc., disclosed in this description can be called and/or referenced by other descriptive terms, names, or other.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    detecting that a cell in a wireless communication system is able to selectively increase or decrease its total transmit power spread over a spectrum by an amount, where the cell is configured with a parameter that indicates a maximum difference in power change, resulting from a change in transmit power, that can exist between a power change of the cell and a power change of a neighbor cell;
    examining, at the cell, a signal comprising at least one value received from at least one neighbor cell;
    based on the examining, determining that a change of the total transmit power is possible, modifying a value associated with the total transmit power, and modifying the total transmit power of the cell by the modified value; and
    signaling the modified value to the at least one neighbor cell in the wireless communication system.

2. The method according to claim 1, where $P_c$ represents the total transmit power of the cell, where $R_{c,max}$ represents the amount that the cell c is able to change its total transmit power, where Rc represents the actual change of the total transmit power, where $\Delta P_c$ represents the parameter that indicates the maximum difference of power changes, where $c \in N_{c0}$ represents the at least one neighbor cell, where $N_{c0}$ is a neighbor cell list, where $R_{c0} = \min_n (R_n + \Delta P)$ represents the value associated with the total transmit power of the cell, and where modifying the value comprises modifying $R_{c0}$ with $n \in N_{c0}$.

3. The method according to claim 1, where the cell is configurable to produce a parameter $R_c$ that indicates by how much the cell has reduced a configured total transmit power $P_c$ such that an actual transmit power of the cell is given by $P_c - R_c$.

4. The method according to claim 3, where the parameter $R_c$ is at least one of signaled from the cell periodically, signaled from the cell in response to the cell modifying the parameter $R_c$, and signaled from the cell in response to a request received from the at least one neighbor cell.

5. The method according to claim 1, where detecting comprises receiving measurement reports from a plurality of user equipment operating in the cell, and where the measurement reports are indicative a reference signal received power.

6. The method according to claim 1, where the parameter that indicates the maximum power difference is received over a management interface from a control node of the wireless communication system in which the cell operates.

7. The method according to claim 1, comprising:
in response to receiving a modified value associated with a total transmit power from the at least one neighbor cell, where the modified value is smaller than a previous value received from the neighbor cell, increasing the total transmit power in accordance with the received modified value.

8. The method according to claim 1, where if increasing the total transmit power would violate a configured value of transmit power, sending an alarm message instead of increasing the total transmit power.

9. The method according to claim 1, comprising receiving a signal comprising measurement information from at least one mobile device served by a base station, where the measurement information indicates that the base station may transmit to the at least one mobile device with more or less power than is currently being used;
based on examining the signal, selectively increasing or decreasing transmit power in accordance with a previously provisioned parameter that represents a power difference that limits a spatial increase or decrease permitted in a cell boundary of the base station; and
sending to one or more neighboring base stations an indication of an amount of increase or decrease in the transmit power used by the base station.

10. The method according to claim 1, performed by a computer readable memory embodying computer program instructions executed by at least one processor.

11. An apparatus comprising:
at least one processor; and
at least one memory including computer program code, where the at least one memory and the computer program code are configured, with the at least one processor, to cause the apparatus to at least:
detect that a cell in a wireless communication system is able to selectively increase or decrease its total transmit power spread over a spectrum by an amount, where the cell is configured with a parameter that indicates a maximum difference in power change, resulting from a change in transmit power, that can exist between a power change of the cell and a power change of a neighbor cell;
examine, at the cell, a signal comprising at least one value received from at least one neighbor cell;
based on the examining, determine that a change of the total transmit power is possible, modifying a value associated with the total transmit power, and modifying the total transmit power of the cell by the modified value; and
signal the modified value to at least one neighbor cell in the wireless communication system.

12. The apparatus according to claim 11, where $P_c$ represents the total transmit power of the cell, where $R_{c,max}$ represents the amount that the cell c is able to change its total transmit power, where Rc represents the actual change of the total transmit power, where $\Delta P_c$ represents the parameter that indicates the maximum difference of power changes, where $c \in N_{c0}$ represents the at least one neighbor cell, where $N_{c0}$ is a neighbor cell list, where $R_{c0} = \min_n (R_n + \Delta P)$ represents the value associated with the total transmit power of the cell, and where modifying the value comprises modifying $R_{c0}$ with $n \in N_{c0}$.

13. The apparatus according to claim 11, where the cell is configured to produce a parameter $R_c$ that indicates by how much the cell has reduced a configured total transmit power $P_c$ such that an actual transmit power of the cell is given by $P_c - R_c$.

14. The apparatus according to claim 13, where the parameter $R_c$ is at least one of signaled from the cell periodically, signaled from the cell in response to the cell modifying the parameter $R_c$, and signaled from the cell in response to a request received from the at least one neighbor cell.

15. The apparatus according to claim 11, where detecting comprises receiving measurement reports from a plurality of user equipment operating in the cell, and where the measurement reports are indicative a reference signal received power.

16. The apparatus according to claim 11, where the parameter that indicates the maximum power difference is received over a management interface from a control node of the wireless communication system in which the cell operates.

17. The apparatus according to claim 11, comprising the computer program code is configured, with the at least one processor, to cause the apparatus to:
in response to receiving a modified value associated with a total transmit power from the at least one neighbor cell, where the modified value is smaller than a previous value received from the neighbor cell, increase the total transmit power in accordance with the received modified value.

18. The apparatus according to claim 11, comprising the computer program code is configured, with the at least one processor, to cause the apparatus to:
receive a signal comprising measurement information from at least one mobile device served by a base station, where the measurement information indicates that the base station may transmit to the at least one mobile device with more or less power than is currently being used;
based on examining the signal, selectively increase or decrease transmit power in accordance with a previously provisioned parameter that represents a power difference that limits a spatial increase or decrease permitted in a cell boundary of the base station; and
send to one or more neighboring base stations an indication of an amount of increase or decrease in the transmit power used by the base station.

19. An apparatus comprising:
means for detecting that a cell in a wireless communication system is able to selectively increase or decrease its total transmit power spread over a spectrum by an amount, where the cell is configured with a parameter that indicates a maximum difference in power change, resulting from a change in transmit power, that can exist between a power change of the cell and a power change of a neighbor cell;
means for examining, at the cell, a signal comprising at least one value received from at least one neighbor cell;
means, based on the examining, for determining that a change of the total transmit power is possible, modifying a value associated with the transmit power, and modifying the total transmit power of the cell by the modified value; and means for signaling the modified value to the at least one neighbor cell in the wireless communication system.

20. The apparatus according to claim 19, where the means for examining, the means for determining comprises at least one data processor, at least one memory, at least one program of computer instructions, and the means for signaling comprises a transmitter.

* * * * *